No. 887,689. PATENTED MAY 12, 1908.
S. OLOP.
REEL HOLDER.
APPLICATION FILED OCT. 24, 1907.
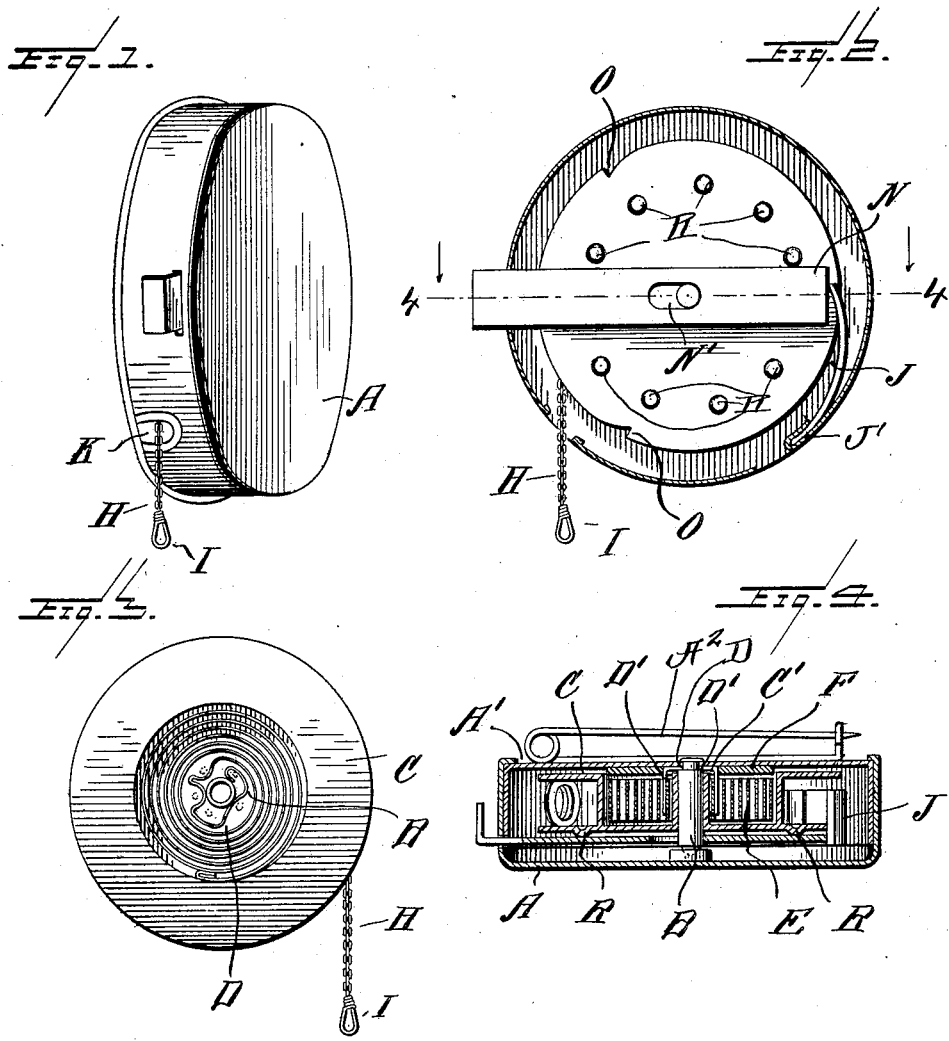
WITNESSES:
INVENTOR
Stephen Olop,
BY Franklin N. Hough
Attorney

UNITED STATES PATENT OFFICE.

STEPHEN OLOP, OF WASHINGTON, DISTRICT OF COLUMBIA, ASSIGNOR OF ONE-HALF TO GAIUS M. BRUMBAUGH, OF WASHINGTON, DISTRICT OF COLUMBIA.

REEL-HOLDER.

No. 887,689.  Specification of Letters Patent.  Patented May 12, 1908.

Application filed October 24, 1907. Serial No. 399,017.

*To all whom it may concern:*

Be it known that I, STEPHEN OLOP, a citizen of the United States, residing at Washington, District of Columbia, have invented certain new and useful Improvements in Reel-Holders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in reel holders and means for releasing a spring-actuated reel whereby a cord or chain may be automatically wound upon the reel under the tension of the spring, and comprises various details of construction and combinations and arrangements of parts which will be hereinafter fully described and then specifically defined in the appended claims.

I illustrate my invention in the accompanying drawings, in which:—

Figure 1 is a perspective view of the reel holder inclosed within a suitable casing. Fig. 2 is a sectional view through the reel and holder. Fig. 3 is a side elevation showing the spring which actuates the reel and Fig. 4 is a cross sectional view on line 4—4 of Fig. 2.

Reference now being had to the details of the drawings by letter, A and A' designate two shell sections which are adapted to telescope one within the other forming a casing, and the marginal edge of the rim of the shell A is adapted to be turned over the outer edge of the shell A' in order to securely hold the parts together, as shown clearly in Fig. 4 of the drawings. A pin A² is fastened to the section A' for convenience in attaching the casing to any object. Mounted in suitable bearings within said shell sections is a stationary post B, and C is a reel having a central cylindrical shell portion C' which has a bearing upon said post. Fixed to said post is a disk D having a series of fingers D' which are bent each at an angle and are disposed parallel with and about the post and extending inside the chambered portion of the reel shell. A spring E is fastened at one end to one of said fingers and is adapted to wind about the various fingers in the manner shown in Fig. 3 of the drawings, the outer end of the spring being fastened to the reel in any suitable manner.

F is a disk which is loosely mounted about the disk D and is of a diameter equal to the chambered portion of the reel in which said spring is mounted and provided for the purpose of holding the spring in place against a lateral movement in one direction within the reel. A suitable chain or cord H is adapted to be fastened to and wind about the grooved circumference of the reel and one end thereof passes through an opening K shown in the flange of the shell section A and has a hook or ring I fastened to its end, whereby it may be conveniently attached to any object.

It will be observed, upon reference to Fig. 2 of the drawings, that one of the flanges of the reel is provided with ratchet teeth O about its circumference which are adapted to be engaged by a spring pawl J fastened at J' to the inner wall of the casing section A' and serves to hold the reel from a rotary movement in one direction. N designates a sliding bar having an elongated slot N' therein for the reception of the post B, and R—R designate lugs which are struck up from one side of a flange of the reel and serve to hold the bar N spaced apart a slight distance from the adjacent face of the reel. One end of the bar N projects through an opening in the casing and is bent at an angle, as shown clearly in Fig. 4 of the drawings, serving as a handle whereby the latter may be pushed in when it is desired to release the free end of the spring pawl J from a ratchet tooth in the circumference of the flange of the reel.

From the foregoing, it will be noted that, by the provision of the means shown and described, after the chain has been wound upon the reel, the spring is put under tension by the pulling out of the chain or cord and the chain held at the desired length by the pawl engaging one of the ratchet teeth upon the marginal edge of the reel. When it is desired to rewind the chain or cord within the casing, the operator by pushing upon the bar, shown in Figs. 2 and 5 of the drawings, may release the pawl J and allow the spring E to uncoil which will cause the reel to wind up the chain.

Heretofore spring-pressed reels of this nature have been held from rotation under tension of the spring by various means, such as centrifugally operated pawls which are found to be objectionable and uncertain but, by the provision of the positive operated mechanism shown and described in the present invention, this objection is obviated and a simple and efficient device afforded for allowing any portion or the entire chain or cord to be readily wound as the pawl is held out of the path of the ratchet teeth upon the reel.

What I claim to be new is:—

1. In combination with a spring-pressed reel with ratchet teeth thereon, a casing for said reel, a post within the casing and upon which the reel is journaled, a spring pawl fixed to the casing and having its free end in the path of the ratchet teeth, a sliding bar having an elongated slot therein to receive said post, the ends of the slot limiting the longitudinal movement of said bar, one end of the latter adapted to bear against the spring pawl to throw the same out of the path of the ratchet teeth, as set forth.

2. In combination with a spring-pressed reel with ratchet teeth thereon, a casing for said reel, a post within the casing and upon which the reel is journaled, a spring pawl fixed to the casing and having its free end in the path of the ratchet teeth, a sliding bar having an elongated slot therein to receive said post, the ends of the slot limiting the longitudinal movement of said bar, one end of the latter adapted to bear against the spring pawl to throw the same out of the path of the ratchet teeth, one of the flanges of the reel having lugs projecting therefrom adapted to hold said bar from contact with the adjacent face of the reel, as set forth.

In testimony whereof I hereunto affix my signature in the presence of two witnesses.

STEPHEN OLOP.

Witnesses:
  A. L. HOUGH,
  FRANKLIN H. HOUGH.